United States Patent
Gupta et al.

(10) Patent No.: US 9,779,440 B2
(45) Date of Patent: Oct. 3, 2017

(54) METHOD AND SYSTEM OF SUGGESTING INFORMATION USED WITH ITEMS OFFERED FOR SALE IN A NETWORK-BASED MARKETPLACE

(71) Applicant: eBay Inc., San Jose, CA (US)

(72) Inventors: Raghav Gupta, Sunnyvale, CA (US); Shen Huang, Shanghai (CN); Xiaoyuan Wu, Shanghai (CN); Qiang Wang, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/264,249

(22) Filed: Sep. 13, 2016

(65) Prior Publication Data

US 2017/0004556 A1   Jan. 5, 2017

Related U.S. Application Data

(63) Continuation of application No. 12/326,005, filed on Dec. 1, 2008, now Pat. No. 9,449,322.

(51) Int. Cl.
*G06F 7/00* (2006.01)
*G06F 17/30* (2006.01)
*G06Q 30/06* (2012.01)
*G06Q 30/00* (2012.01)

(52) U.S. Cl.
CPC ..... *G06Q 30/0625* (2013.01); *G06F 17/3061* (2013.01); *G06F 17/3064* (2013.01); *G06F 17/3097* (2013.01); *G06F 17/30637* (2013.01); *G06F 17/30693* (2013.01); *G06F 17/30864* (2013.01); *G06Q 30/00* (2013.01); *G06Q 30/0601* (2013.01)

(58) Field of Classification Search
CPC ........... G06F 17/2725; G06F 17/30693; G06F 17/30637; G06C 30/0601
See application file for complete search history.

(56) References Cited

U.S. PATENT DOCUMENTS

| | | |
|---|---|---|
| 5,535,382 A | 7/1996 | Ogawa |
| 5,778,363 A | 7/1998 | Light |
| 5,873,001 A | 2/1999 | Brinker et al. |
| 5,963,910 A | 10/1999 | Ulwick |
| 6,205,456 B1 | 3/2001 | Nakao |

(Continued)

FOREIGN PATENT DOCUMENTS

GB   2366033   2/2002

OTHER PUBLICATIONS

"U.S. Appl. No. 11/679,973, Advisory Action dated Nov. 23, 2009", 3 pgs.

(Continued)

*Primary Examiner* — Charles Lu
(74) *Attorney, Agent, or Firm* — Schwegman Lundberg & Woessner

(57) ABSTRACT

Methods and systems to suggest information to be used with an item being listed for sale may include analyzing a plurality of stored entries of words and identifying certain entries based on desirability scores associated with those entries. The entries and the desirability scores may be identified based on their frequency of use in the plurality of stored entries and/or in the title information or other information associated with items offered for sale.

15 Claims, 12 Drawing Sheets

(56) References Cited

U.S. PATENT DOCUMENTS

| | | | |
|---|---|---|---|
| 6,393,389 B1 | 5/2002 | Chanod et al. | |
| 6,438,579 B1 | 8/2002 | Hosken | |
| 6,490,577 B1 | 12/2002 | Anwar | |
| 6,714,929 B1 | 3/2004 | Micaelian et al. | |
| 6,785,676 B2 | 8/2004 | Oblinger | |
| 6,901,399 B1 | 5/2005 | Corston et al. | |
| 7,340,428 B1 | 3/2008 | White et al. | |
| 7,814,112 B2 | 10/2010 | Gupta et al. | |
| 8,200,683 B2 | 6/2012 | Gupta et al. | |
| 8,954,424 B2 | 2/2015 | Gupta et al. | |
| 9,449,322 B2 | 9/2016 | Gupta et al. | |
| 2002/0069190 A1 | 6/2002 | Geiselhart | |
| 2002/0152204 A1* | 10/2002 | Ortega | G06F 17/2725 |
| 2003/0014428 A1 | 1/2003 | Mascarenhas | |
| 2003/0014501 A1 | 1/2003 | Golding et al. | |
| 2003/0028527 A1 | 2/2003 | Crosby et al. | |
| 2003/0033299 A1 | 2/2003 | Sundaresan | |
| 2003/0040850 A1 | 2/2003 | Najmi et al. | |
| 2003/0195877 A1 | 10/2003 | Ford et al. | |
| 2004/0068495 A1 | 4/2004 | Inaba et al. | |
| 2004/0098385 A1 | 5/2004 | Mayfield | |
| 2004/0181604 A1 | 9/2004 | Immonen | |
| 2005/0039136 A1 | 2/2005 | Othmer | |
| 2005/0097628 A1 | 5/2005 | Lussier et al. | |
| 2005/0160107 A1 | 7/2005 | Liang | |
| 2005/0177582 A1* | 8/2005 | Baird-Smith | G06F 17/30997 |
| 2005/0192992 A1 | 9/2005 | Reed et al. | |
| 2006/0031340 A1 | 2/2006 | Mathew et al. | |
| 2006/0074864 A1 | 4/2006 | Naam et al. | |
| 2006/0095346 A1 | 5/2006 | Gambhir | |
| 2006/0161534 A1 | 7/2006 | Carson, Jr. et al. | |
| 2006/0167896 A1 | 7/2006 | Kapur et al. | |
| 2006/0242129 A1 | 10/2006 | Libes et al. | |
| 2007/0027743 A1 | 2/2007 | Carson et al. | |
| 2007/0027864 A1* | 2/2007 | Collins | G06Q 30/0211 |
| 2007/0288433 A1 | 12/2007 | Gupta et al. | |
| 2008/0077585 A1* | 3/2008 | Li | G06Q 30/02 |
| 2008/0155585 A1 | 6/2008 | Craner et al. | |
| 2008/0201324 A1* | 8/2008 | Aronowich | G06F 17/30864 |
| 2008/0215456 A1 | 9/2008 | West et al. | |
| 2010/0017398 A1 | 1/2010 | Gupta et al. | |
| 2010/0138436 A1 | 6/2010 | Gupta et al. | |
| 2013/0246407 A1 | 9/2013 | Gupta et al. | |

OTHER PUBLICATIONS

"U.S. Appl. No. 11/679,973, Appeal Brief dated May 13, 2010", 24 pgs.

"U.S. Appl. No. 11/679,973, Decision on Pre-Appeal Brief Request dated Apr. 13, 2010", 2 pgs.

"U.S. Appl. No. 11/679,973, Final Office Action dated Aug. 21, 2009", 13 pgs.

"U.S. Appl. No. 11/679,973, Non Final Office Action dated Mar. 18, 2009", 3 pgs.

"U.S. Appl. No. 11/679,973, Notice of Allowance dated Jun. 9, 2010", 17 pgs.

"U.S. Appl. No. 11/679,973, Pre-Appeal Brief Request dated Dec. 21, 2009", 5 pgs.

"U.S. Appl. No. 11/679,973, Response dated Jun. 12, 2009 to Non Final Office Action dated Mar. 18, 2009", 12 pgs.

"U.S. Appl. No. 11/679,973, Response dated Nov. 5, 2009 to Final Office Action dated Aug. 21, 2009", 13 pgs.

"U.S. Appl. No. 12/326,005, Examiner Interview Summary dated May 19, 2016", 3 pgs.

"U.S. Appl. No. 12/326,005, Examiner Interview Summary dated May 22, 2014", 3 pgs.

"U.S. Appl. No. 12/326,005, Examiner Interview Summary dated Nov. 19, 2014", 3 pgs.

"U.S. Appl. No. 12/326,005, Final Office Action dated Feb. 12, 2014", 11 pgs.

"U.S. Appl. No. 12/326,005, Final Office Action dated Mar. 20, 2013", 11 pgs.

"U.S. Appl. No. 12/326,005, Final Office Action dated Mar. 26, 2012", 10 pgs.

"U.S. Appl. No. 12/326,005, Final Office Action dated Sep. 24, 2015", 13 pgs.

"U.S. Appl. No. 12/326,005, Final Office Action dated Oct. 24, 2014", 10 pgs.

"U.S. Appl. No. 12/326,005, Non Final Office Action dated Feb. 11, 2016", 12 pgs.

"U.S. Appl. No. 12/326,005, Non Final Office Action dated Feb. 12, 2015", 10 pgs.

"U.S. Appl. No. 12/326,005, Non Final Office Action dated Jun. 5, 2014", 9 pgs.

"U.S. Appl. No. 12/326,005, Non Final Office Action dated Aug. 29, 2012", 11 pgs.

"U.S. Appl. No. 12/326,005, Non Final Office Action dated Sep. 11, 2013", 11 pgs.

"U.S. Appl. No. 12/326,005, Non Final Office Action dated Oct. 17, 2011", 10 pgs.

"U.S. Appl. No. 12/326,005, Notice of Allowance dated May 27, 2016", 5 pgs.

"U.S. Appl. No. 12/326,005, Response dated Jan. 13, 2014 to Non-Final Office Action dated Sep. 11, 2013", 12 pgs.

"U.S. Appl. No. 12/326,005, Response dated Jan. 17, 2012 to Non Final Office Action dated Oct. 17, 2011", 10 pgs.

"U.S. Appl. No. 12/326,005, Response dated Jan. 23, 2015 to Final Office Action dated " Oct. 24, 2014, 10 pgs.

"U.S. Appl. No. 12/326,005, Response dated May 11, 2016 to Non Final Office Action dated Feb. 11, 2016", 23 pgs.

"U.S. Appl. No. 12/326,005 Response dated May 19, 2014 to Final Office Action dated Feb. 12, 2014"; 10 pgs.

"U.S. Appl. No. 12/326,005, Response dated Jul. 26, 2012 to Final Office Action dated Mar. 26, 2012", 9 pgs.

"U.S. Appl. No. 12/326,005, Response dated Aug. 12, 2015 to Non-Final Office Action dated Feb. 12, 2015", 12 pgs.

"U.S. Appl. No. 12/326,005, Response dated Aug. 20, 2013 to Final Office Action dated Mar. 20, 2013", 10 pgs.

"U.S. Appl. No. 12/326,005, Response dated Aug. 22, 2011 to Restriction Requirement dated Jul. 20, 2011", 6 pgs.

"U.S. Appl. No. 12/326,005, Response dated Oct. 6, 2014 to Non Final Office Action dated Jun. 5, 2014", 10 pgs.

"U.S. Appl. No. 12/326,005, Response dated Dec. 26, 2015 to Final Office Action dated Sep. 24, 2015", 13 pgs.

"U.S. Appl. No. 12/326,005, Response dated Dec. 31, 2012 to Non Final Office Action dated Aug. 29, 2012", 10 pgs.

"U.S. Appl. No. 12/326,005, Restriction Requirement dated Jul. 20, 2011", 6 pgs.

"U.S. Appl. No. 12/495,663, Final Office Action dated Mar. 28, 2011", 11 pgs.

"U.S. Appl. No. 12/495,663, Non Final Office Action dated Nov. 17, 2010", 17 pgs.

"U.S. Appl. No. 12/495,663, Notice of Allowance dated Feb. 15, 2012", 14 pgs.

"U.S. Appl. No. 12/495,663, Response dated Feb. 17, 2011 to Non Final Office Action dated Nov. 17, 2010", 13 pgs.

"U.S. Appl. No. 12/495,663, Response filed Jun. 28, 2011 to Final Office Action dated Mar. 28, 2011", 14 pgs.

"U.S. Appl. No. 13/491,183, Advisory Action dated May 27, 2014", 3 pgs.

"U.S. Appl. No. 13/491,183, Appeal Brief dated Aug. 25, 2014", 18 pgs.

"U.S. Appl. No. 13/491,183, Appeal Brief filed Oct. 23, 2015", 18 pgs.

"U.S. Appl. No. 13/491,183, Decision on Pre-Appeal Brief Request dated Jul. 24, 2014", 2 pgs.

"U.S. Appl. No. 13/491,183, Examiner's Answer to Appeal Brief dated Feb. 29, 2016", 10 pgs.

"U.S. Appl. No. 13/491,183, Final Office Action dated Feb. 23, 2015", 23 pgs.

"U.S. Appl. No. 13/491,183, Final Office Action dated Mar. 6, 2014", 19 pgs.

"U.S. Appl. No. 13/491,183, Final Office Action dated Apr. 10, 2013", 15 pgs.

(56) References Cited

OTHER PUBLICATIONS

"U.S. Appl. No. 13/491,183, Non Final Office Action dated Aug. 7, 2013", 14 pgs.
"U.S. Appl. No. 13/491,183, Non Final Office Action dated Nov. 6, 2014", 21 pgs.
"U.S. Appl. No. 13/491,183, Non Final Office Action dated Nov. 15, 2012", 13 pgs.
"U.S. Appl. No. 13/491,183, Pre-Appeal Brief Request dated Jun. 6, 2014", 4 pgs.
"U.S. Appl. No. 13/491,183, Reply Brief dated Apr. 29, 2016", 5 pgs.
"U.S. Appl. No. 13/491,183, Response dated Jan. 7, 2014 to Non Final Office Action dated Sep. 7, 2013", 7 pgs.
"U.S. Appl. No. 13/491,183, Response dated Feb. 6, 2015 to Non Final Office Action dated Nov. 6, 2014", 9 pgs.
"U.S. Appl. No. 13/491,183, Response dated Feb. 15, 2013 to Non Final Office Action dated Nov. 15, 2012", 10 pgs.
"U.S. Appl. No. 13/491,183, Response dated May 6, 2014 to Final Office Action dated Mar. 6, 2014", 8 pgs.
"U.S. Appl. No. 13/491,183, Response dated Jul. 10, 2013 to Final Office Action dated Apr. 10, 2013", 10 pgs.
"U.S. Appl. No. 13/875,074, Final Office Action dated Nov. 27, 2013", 21 pgs.
"U.S. Appl. No. 13/875,074, Non Final Office Action dated Jun. 27, 2013", 17 pgs.
"U.S. Appl. No. 13/875,074, Notice of Allowance dated Aug. 4, 2014", 16 pgs.
"U.S. Appl. No. 13/875,074, Preliminary Amendment dated May 7, 2013", 5 pgs.
"U.S. Appl. No. 13/875,074, Response dated Feb. 27, 2014 to Final Office Action dated Nov. 27, 2013", 10 pgs.
"U.S. Appl. No. 13/875,074, Response dated Oct. 28, 2013 to Non Final Office Action dated Jun. 27, 2013", 16 pgs.

* cited by examiner

380

Title
| Ipod Nano mp3 | ~385

Suggestions

390
| Term | Desirability Score | Add | Remove |
|---|---|---|---|
| Mp3 | 90% | ☐ | ☐ |
| Player | 85% | ✓ | ☐ |
| Case | -80% | ☐ | ☐ |

391 — Term, 392 — Add, 393 — (Add column), 394 — Remove

*FIG. 3B*

METHOD AND SYSTEM OF SUGGESTING INFORMATION USED WITH ITEMS OFFERED FOR SALE IN A NETWORK-BASED MARKETPLACE

CROSS-REFERENCE TO RELATED APPLICATIONS

This application is a continuation of and claims the benefit of priority to U.S. patent application Ser. No. 12/326,005, filed on Dec. 1, 2008, entitled "METHOD AND SYSTEM OF SUGGESTING INFORMATION USED WITH ITEMS OFFERED FOR SALE IN A NETWORK-BASED MARKETPLACE" which claims the benefit of priority to U.S. patent application Ser. No. 11/679,973, entitled "DETERMINING RELEVANCY AND DESIRABILITY OF TERMS" filed Feb. 28, 2007, now U.S. Pat. No. 7,814,112, both of which are incorporated herein by reference in their entirety.

FIELD

The disclosed subject matter relates generally to the field of data processing and, in one example embodiment, to a system that suggests information that may be used with items offered for sale in a network-based marketplace.

BACKGROUND

Network-based marketplaces enable sellers to offer their items to potential buyers online. The items may be offered for sale in an auction-format or in a fixed-price-format. The sellers may provide description information and price information for the items. Potential buyers may visit the web sites to browse and search for items that they may be interested in. The potential buyers may make purchase decisions based on the description information and the price information.

BRIEF DESCRIPTION OF THE DRAWINGS

Embodiments are illustrated by way of example and not limitation in the figures of the accompanying drawings, in which like references indicate similar elements and in which:

FIG. 3B is a block diagram that illustrates an example interface that may be used to suggest terms based on their desirability scores, in accordance with some example embodiments.

DETAILED DESCRIPTION

According to some example embodiments, a method and a system for suggesting information associated with items offered for sale is disclosed. An item to be offered for sale in a network-based marketplace may be associated with information provided by the seller. At least one term or concept may be extracted from the information provided by the seller. Based on the extracted term or concept, at least one other term or concept may be suggested. The suggested term or concept may be selected based on its ranking as compared to other possible suggested terms or concepts.

Other features of the method and the system will be apparent from the accompanying drawings and from the detailed description that follows. In the following description, for purposes of explanation, numerous specific details are set forth in order to provide a thorough understanding of embodiments. It will be evident, however, to one skilled in the art that the present description may be practiced without these specific details.

In some example embodiments, a computer system (e.g., a client machine, server machine etc) configured by an application may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In traditional network-based marketplaces, there may be many items offered for sale. The items offered for sale are often associated with listings that include information about the items. The information may include title information, price information, item description information, shipping information, etc. Many items may be sold quickly, while many others may remain unsold and may need to be relisted. It is possible that these items may be overlooked because they fail to attract the attention of the potential buyers. For example, the title information may be too short and/or not descriptive, fail to include terms or combination of terms that may trigger the attention of the potential buyers, etc.

Figure 1:
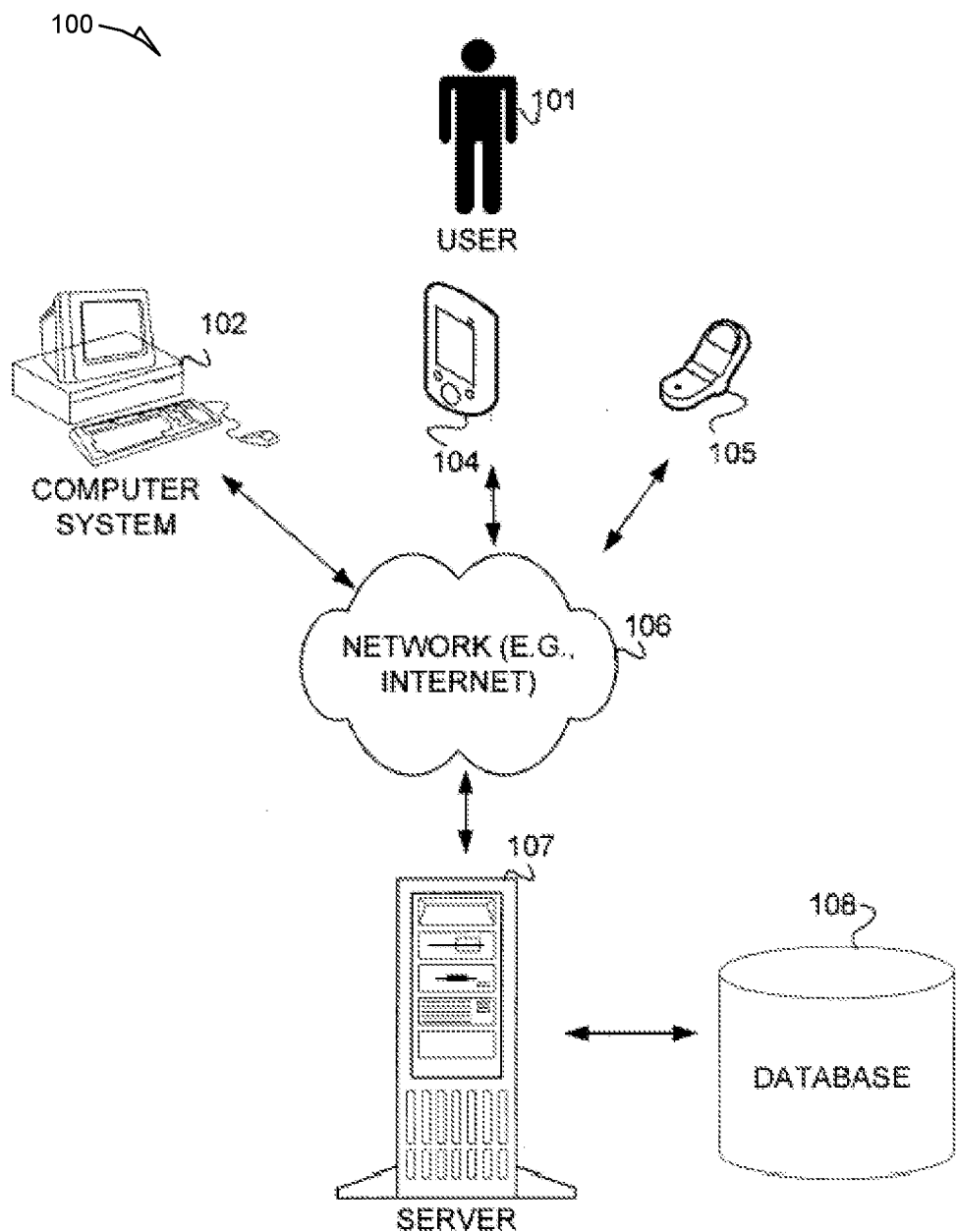
FIG. 1 is a network diagram illustrating an overview of an example system that may be used, in accordance with some example embodiments.

FIG. 1 is a network diagram illustrating an overview of an example system that may be used, in accordance with some example embodiments. System 100 may include server computer system 107 coupled to database 108. The server computer system 107 and the database 108 may be associated with a network-based marketplace. The server computer system 107 may be connected to network 106 (e.g., the Internet) via a communication interface. It may be noted that the server computer system 107 may be a single computer system, or it may be a cluster of computer systems located in the same geographical area or in different geographical areas. Although not shown, the database 108 may be associated with a database server.

User 101 may use the services of the network-based marketplace by connecting to the network 106 using a client device and via wired or wireless communication. Some examples of client devices include computer system 102, a personal digital assistant (PDA) 104, a cell phone 105, etc. For some example embodiments, the user 101 may use a client device to list an item and to offer the item for sale in the network-based marketplace. The user 101 may connect to the network 106 and access a listing service of the network-based marketplace. The listing service may be associated with a graphical user interface (GUI) presented via a webpage. The webpage may be associated with a website of the network-based marketplace. The user 101 may use the listing service to provide information about the item offered for sale. The information may include, for example, title information, item description information, price information, shipping information, etc.

Figure 2:
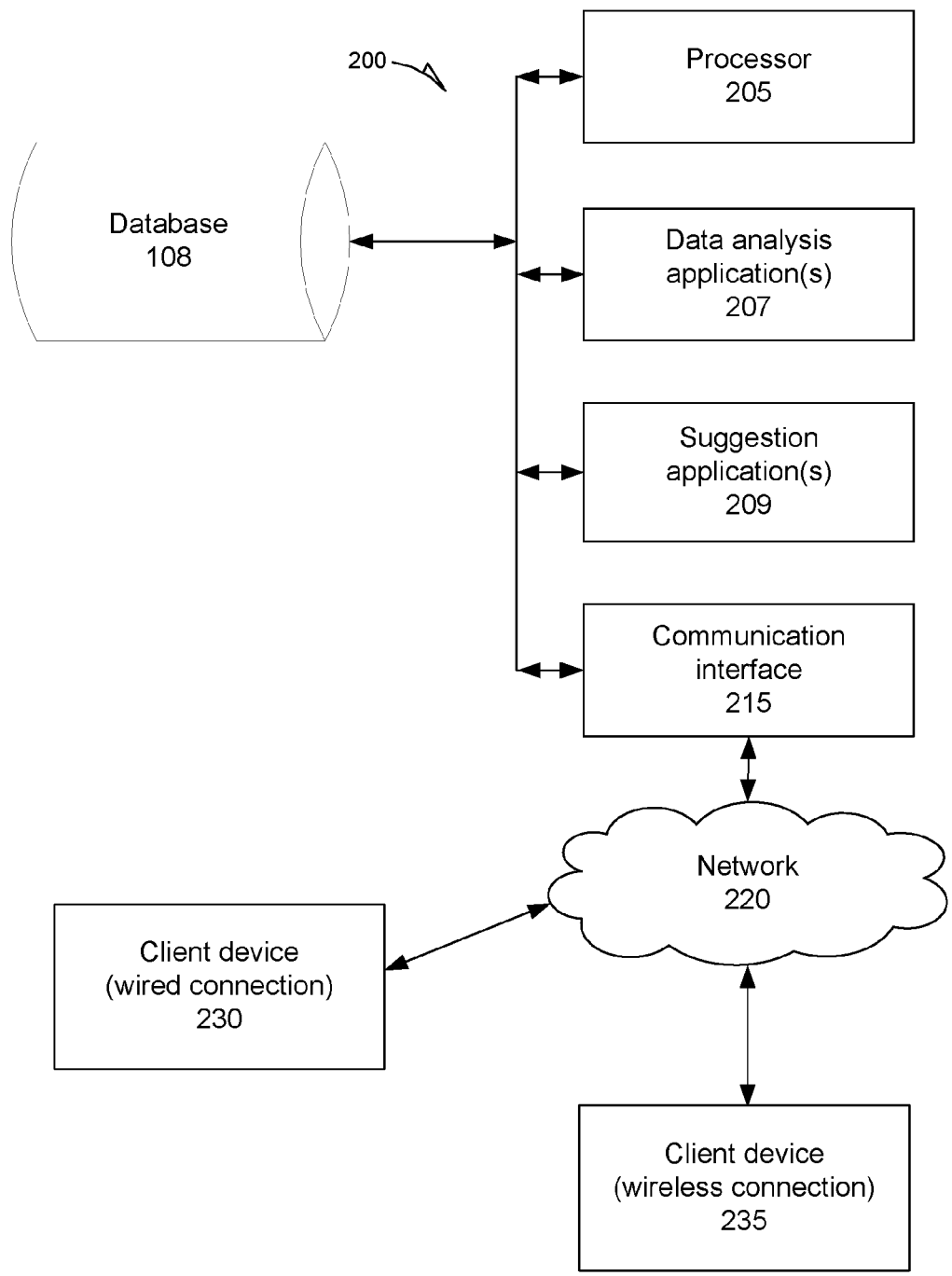
FIG. 2 is a block diagram illustrating an overview of an example system that may be used to suggest information, in accordance with some example embodiments.

FIG. 2 is a block diagram illustrating an overview of an example system that may be used to suggest information, in accordance with some example embodiments. The system 200 may be associated with a network-based marketplace and may include processor 205 coupled with the database 108. The system 200 may also include data analysis application(s) 207 and suggestion application(s) 209. Communication interface 215 coupled with the processor 205 may be used to connect the system 200 to network 220. Services of the system 200 may be accessible by the users using client devices 230 and 235.

For some example embodiments, the data analysis application(s) 207 may analyze data stored in the database 108 to determine relevancy and desirability of terms. The terms may be included in search queries. The search queries may be specified by the users when the users search for and purchase items or services offered for sale in the network-based marketplace. A search query may include one or more terms received via a search interface associated with the network-based marketplace.

For some example embodiments, the data analysis application(s) 207 may track the activities of the users in an aggregated manner. This may include tracking and storing the search queries. This may also include tracking terms included in the information associated with items that the user selects or clicks. The data analysis application(s) 207 may also track whether a user makes a purchase after selecting an item. For some example embodiments, the data analysis application(s) 207 may also track terms that the users avoid after performing a search. Results of the analysis performed by the data analysis application(s) 207 may include desirability scores of the terms.

For some example embodiments, the desirability scores of the terms may depend on how the terms are used in the perspective of demand as related to search queries and in the perspective of supply as related to items. As for the demand, the data analysis application(s) 207 may receive search queries initiated by users via a search interface. The data analysis application(s) 207 may extract terms (or keywords) from each of the search queries. The extracted terms may then be added to a set of stored terms to generate updated stored terms. For each term, a demand percentage is calculated or recalculated based on the updated stored terms. As for the supply, a total occurrence of unique terms in the title information of stored items may be determined. A percentage occurrence of each term is then determined based on the result of the total occurrence. For example, if there were 1000 items in the result, and the term "charger" occurs in 900 items, then the term "charger" is associated with a supply percentage of 90%. When the term "player" occurs in 50 items, then its associated supply percentage is 5%. A formula may be used to determine the desirability score of a particular term based at least on its demand percentage and its supply percentage. The desirability score of the terms may be stored in the database 108.

It may be noted that a desirability score may be associated with a positive number (desirable) or a negative number (not desirable). For example, when a user specifies a search query that includes the phrase "Ipod Nano", corresponding terms and their desirability scores may include "mp3 90%", "player 85%", "transmitter −40%", "case −80%", and so on. The techniques of analyzing the search queries, generating the desirability scores, tracking the user activities, and so on are described in more details in U.S. Utility application Ser. No. 11/679,973, filed on Feb. 28, 2007 entitled "DETERMINING RELEVANCY AND DESIRABILITY OF TERMS" and incorporated herein by reference.

For some example embodiments, the data analysis application(s) 207 may analyze the search queries stored in the database 108 to find terms that occur together (or co-occurring terms). For some example embodiments, the data analysis application(s) 207 may analyze similar items to determine the co-occurring terms. Similarity may be determined based on the title information of the items. The data analysis application(s) 207 may use one or more criteria to determine the similarity. For example, when the title information of two items has at least two similar nouns, the two items may be considered to be similar. As another example, when the title information of two items has two similar phrases, the two items may be considered to be similar. Other techniques may be used to determine similarity. The co-occurring terms determined from the two techniques described above may be merged and ranked according to their frequency of occurrence.

For some example embodiments, the suggestion application(s) 209 may include operations that suggest terms based on their desirability scores and/or based on co-occurring terms. The suggestion application(s) 208 may extract one or more terms from the title information of the item being listed. Based on the extracted terms, co-occurring terms may be determined as suggested to the user. The co-occurring terms and/or the terms with the high desirability scores may be suggested as candidates that may be used to modify the title information. It may be noted that the suggestion application(s) 209 may extract the one or more terms from other section (e.g. item description information, etc.) of the listing besides the title information. It may also be noted that the suggestion application(s) 209 may extract concepts from the information associated with the item being listed. A concept may include two or more terms.

Figure 3A:
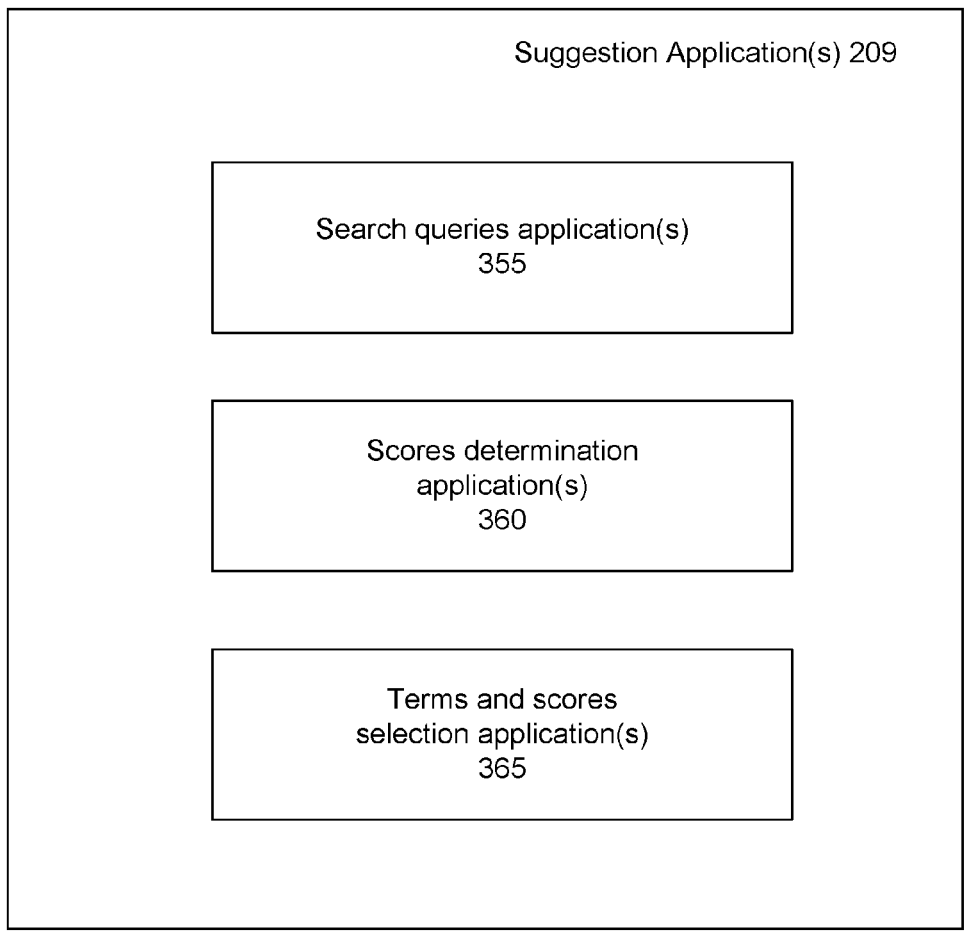
FIG. 3A is a block diagram that illustrates an example of a suggestion application, in accordance with some example embodiments.

FIG. 3A is a block diagram that illustrates an example of a suggestion application, in accordance with some example embodiments. The suggestion application(s) 209 may include search queries application(s) 355, scores determination application(s) 360, and terms and scores selection application(s) 365.

Based on the information (e.g., title information) associated with the item being listed, the search queries application(s) 355 may search the database 108 (described in FIGS. 1-2) to find stored search queries that the title information may satisfy. In other words, the search queries application(s) 355 may find all stored search queries for which the item being listed would be included in the results. For some example embodiments, the search queries application(s) 355 may perform substring match operations. When a stored search query includes all the terms in the title information of the item being listed, there is a match.

For some example embodiments, each of the matching search queries may be used by the scores determination application(s) 360 to find the desirability scores of the terms in the title information (and not in the matching search query) and the composites score of all the desirability scores of the terms. There may be a composite score for each of the matching search queries.

The terms and scores selection application(s) 365 may retrieve pairs of terms and desirability scores from the database 108 for each search query and display those pairs to the user. Thus, if the user includes the phrase "Ipod Nano mp3" in the title information, a topmost search query resulting from the operations above may be "Ipod Nano" and the term desirability scores pairs may include "mp3 90%", "player 85%", etc.

The terms and scores selection application(s) 365 may display to the user that the term "mp3", which is already included in the title information, has a desirability score of 90%. Furthermore, the terms and scores selection application(s) 365 may also display to the user that the term "player" has a desirability score of 85%. This indicates to the user that the term "player" has a high desirability for buyers when they are looking for an "Ipod Nano".

For some example embodiments, in addition to displaying terms that the user may want to add to the title information, the terms and scores application(s) 365 may also display terms that the user may want to avoid. For example, the term "case" may be displayed with a negative desirability score of −80%. This may discourage the user from including the term "case" in the title information. If the term "case" was already included in the title information, this provides the user an opportunity to remove the term "case" due to its negative desirability score.

For some example embodiments, the user may have the option to add the terms with the high desirability scores to any position in the title. Adding a new term or removing an existing term may be performed using a GUI and mouse click operations. This may be convenient since the user may not have to use a keyboard to do the addition or removal of terms. For some example embodiments, whenever the user modifies the title information, the suggestion application(s) 209 may automatically analyze the modified title information and may present a new set of suggestions based upon the modified title information.

FIG. 3B is a block diagram that illustrates an example interface that may be used to suggest terms based on their desirability scores, in accordance with some example embodiments. This example is based on using the title information provided by a user to suggest terms. Interface 380 may include a title area 385 to receive title information from the user. In this example, the title information includes the phrase "Ipod Nano mp3". The interface 380 may include a suggestion display area 390 to present to the user suggested terms and their desirability scores. The suggestion display area 390 may include a term column 391, a desirability score column 392, an add column 393 and a remove column 394. The term column 391 may include terms that are suggested to the user. The desirability score column 392 may include desirability scores of the suggested terms. The add column 393 may include options (e.g., check box, etc) to enable the user to add a suggested term. The remove column 394 may include options to enable the user to remove a suggested term. Based on the example desirability scores under the desirability score column 392, the user may add the term "player" to the title information. This is illustrated in the example by the checkmark in the add option corresponding to the term "player".

Figure 4A:
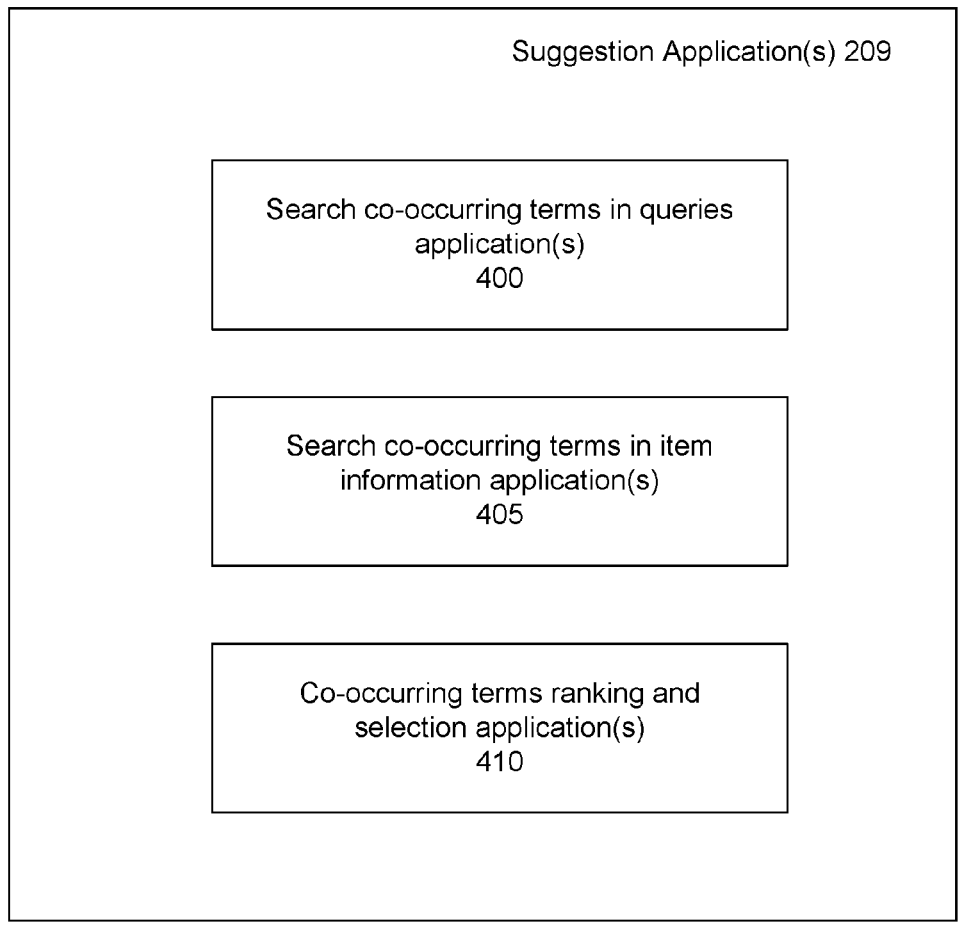
FIG. 4A is a block diagram that illustrates another example of a suggestion application, in accordance with some example embodiments.

FIG. 4A is a block diagram that illustrates another example of a suggestion application, in accordance with some example embodiments. The suggestion application(s) 209 may include application(s) 400 to search co-occurring terms in queries, application(s) 405 to search co-occurring terms in item information, and application(s) 410 to rank and select co-occurring terms.

For some example embodiments, the database 108 (described in FIGS. 1-2) may store search queries that have been initiated by many users for over a period of time. The database 108 may also store information about many items that are listed by many users for over a period of time. The search co-occurring terms in queries application(s) 400 may search the database 108 to find co-occurring terms in the stored search queries. The search co-occurring terms in item information application(s) 405 may search the database 108 to find co-occurring terms in the stored item information. For some example embodiments, the search co-occurring terms in item information may search the title information of the items. The results of the search co-occurring terms in queries application(s) 400 and the search co-occurring terms in item information application(s) 405 may be used by the co-occurring terms ranking and selection application(s) 410. For some example embodiments, the results may be used individually to provide suggested terms to the user. For some other example embodiments, the results may be merged together and the co-occurring terms may be ranked according to their frequency. The co-occurring terms that occur more frequently together may be ranked higher than those terms that occur less frequently together. The ranked co-occurring terms may be stored in the database 108. The co-occurring terms ranking and selection application(s) 410 may analyze the title information of the item being listed to determine terms that may match with the ranked co-occurring terms. At least a subset of the matching ranked co-occurring terms may be suggested to the user by the co-occurring terms ranking and selection application(s) 410.

Figure 4B:
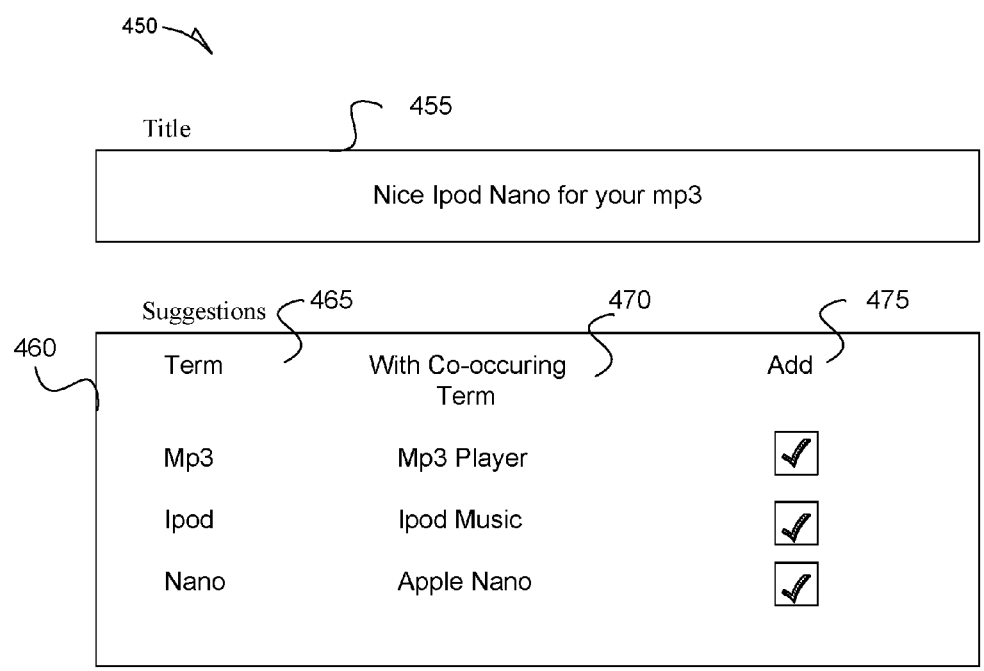
FIG. 4B is a block diagram that illustrates an example interface that may be used to suggest terms based on their co-occurrence, in accordance with some example embodiments.

FIG. 4B is a block diagram that illustrates an example interface that may be used to suggest terms based on their co-occurrence, in accordance with some example embodiments. This example is based on using the title information provided by a user to suggest terms. Interface 450 may include a title area 455 to receive title information from the user. In this example, the title information includes the phrase "Nice Ipod Nano for your mp3". The interface 450 may include a suggestion display area 460 to present to the user suggested co-occurring terms. The suggestion display area 460 may include a term column 465, a co-occurring term column 470, and an add column 475. The term column 465 may include terms that are found in the title information provided by the user. It may be noted that not all of the terms in the title description may be used to find co-occurring terms. In this example, only the terms "Mp3", "Ipod", and "Nano" are used. These three terms may be selected because each of them may represent a key concept of the item being listed. As mentioned above, a concept may include one or more terms. For some example embodiments, a co-occurring term may be based on a concept of two or more terms. For example, a concept may be "Harley Davidson" and a co-occurring term with this concept may be "motorcycles".

The co-occurring term column 470 may include a list of suggested co-occurring terms corresponding to the terms in the term column 465. The co-occurring terms displayed under the co-occurring term column 470 may be those that are ranked the highest in frequency of occurrence. The add column 475 may include options (e.g., check box, etc) to enable the user to add a suggested co-occurring term. In this example, all suggested co-occurring terms are selected, as illustrated by the checkmarks in the add column 475.

Figure 5:
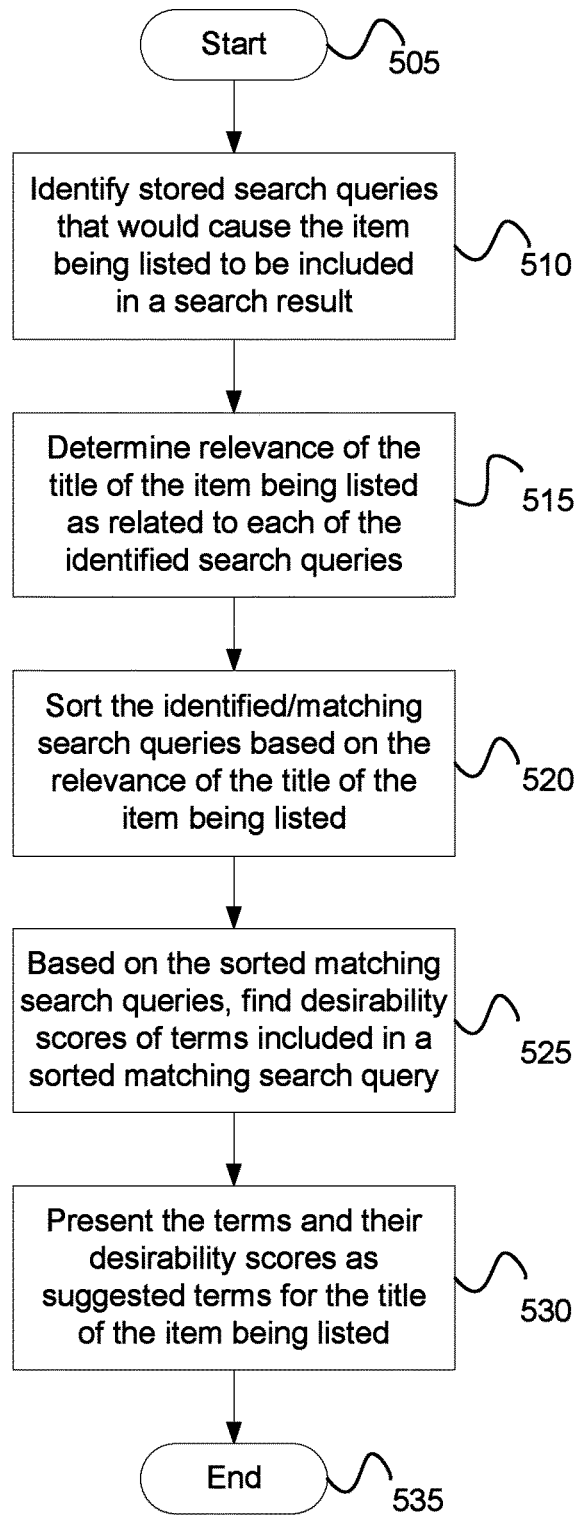
FIG. 5 is a flow diagram that illustrates an example method that may be used to suggest terms based on desirability scores, in accordance with some example embodiments.

FIG. 5 is a flow diagram that illustrates an example method that may be used to suggest terms based on desirability scores, in accordance with some example embodiments. The flow may start at block 505. At block 510, operations are performed to find the stored search queries that would cause the item being listed to be included in a search result. For example, each of the stored search queries may be analyzed to find substrings that may be included in the title information of the item being listed. If all of the terms in a stored search query are included in the title information of the item being listed, then there is a match. There may be more than one matching search query. The matching search queries may be a subset of the stored search queries.

At block 515, operations are performed to determine the relevance of the title information of the item being listed as related to each of the matching search queries. This may include getting the desirability scores of the terms that are included in the title information of the item being listed but not included in the matching search query. This operation may be performed for each matching search query. The desirability scores of all the terms may then be added to generate a composite score for each matching search query. This composite score may indicate a degree of relevancy of the title information of the item being listed to a corresponding matching search query.

At block 520, the matching search queries may then be sorted based on their composite scores. The sorting of the matching search queries may be based on a descending order with the matching search query associated with the highest composite scores being at the top. At block 525, operations may be performed to find the desirability scores of terms included in the sorted matching search queries. For each matching search query, the terms and desirability score pairs for terms in the matching search query may be retrieved from the database 108. For some example embodiments, only a subset of the sorted matching search queries may be analyzed to find the terms and their desirability scores. At block 530, the retrieved terms and desirability scores may be presented as suggested terms that may be used to modify the title information of the item being listed. The flow may end at block 535.

Figure 6:
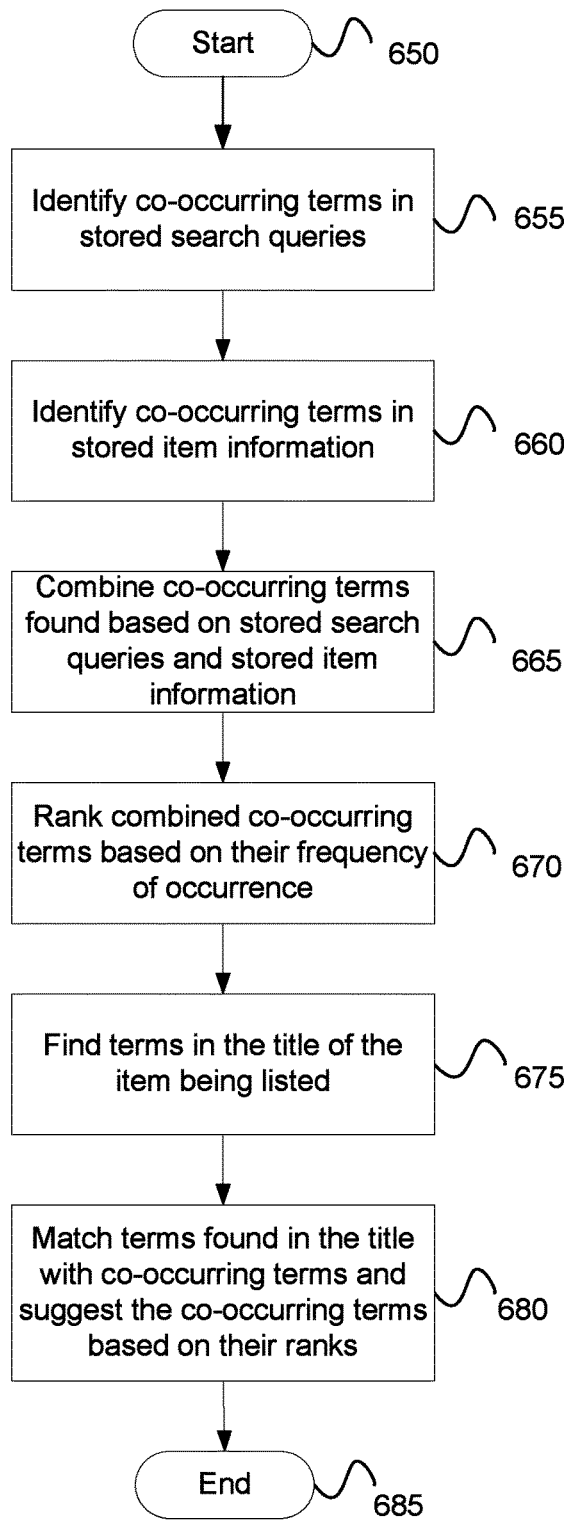
FIG. 6 is a flow diagram that illustrates an example method that may be used to suggest terms based on co-occurring terms, in accordance with some example embodiments.

FIG. 6 is a flow diagram that illustrates an example method that may be used to suggest terms based on co-occurring terms, in accordance with some example embodiments. The flow may start at block 650. At block 655, operations may be performed to find co-occurring terms in the stored search queries. At block 660, operations may be performed to find co-occurring terms in the stored item information for similar items. The similar items may include items that are currently listed, items in which the listings have expired, or a combination of both. The similar items may be further narrowed based on item categories.

The stored search queries and the stored item information may have been provided by the users and/or sellers of the items in the networked-based marketplace for over a certain period of time (e.g., 30 days). However, the period of time that may be used may be changed to include or exclude more data.

At block 665, the co-occurring terms determined based on the stored search queries and the item information may be combined. At block 670, the combined co-occurring terms may be ranked according to their frequency of occurrence. At block 675, operations may be performed to find terms or concepts in the title information of the item being listed. At block 680, each of the terms or concepts found in the title information may be used to match with the co-occurring terms. For example, if the title information includes the term "helmet", and there is a matching co-occurring terms of "motorcycle helmet," then the term "motorcycle" may be added to title information. Similarly, if there is a matching co-occurring terms "WWII helmet" that is ranked lower than the co-occurring terms "motorcycle helmet", the term "WWII" may be suggested and the user may decide not to accept the suggestion.

For some example embodiments, modifying terms or linking terms (e.g., adjectives, adverbs, propositions, etc.) may not be selected from the title information for the purpose of identifying matching co-occurring terms. It may be noted that the co-occurring terms determined based on the stored search queries may reflect what the potential buyers think are important, while the co-occurring terms determined based on the stored item information may reflect what the sellers think are important. For some example embodiments, either the co-occurring terms determined based on the stored search queries or the co-occurring terms determined based on the stored item information may be used, but not both. For some other example embodiments, both types of co-occurring terms may be used together to determine the suggested terms.

For some example embodiments, the matching of the terms in the title information may be with the co-occurring terms that occur more frequently based on their ranks. The matching co-occurring terms may then be suggested to be included in the title information of the item being listed. For some example embodiments, only a subset of the ranked co-occurring terms may be used in the suggestion.

For some example embodiments, the user may select which suggested terms to use (including selecting none) and update the title information. The suggested terms may be presented in a list (as illustrated in FIG. 4B). The user may select a suggested term, and the operations in block 530 shown in FIG. 5 may suggest a location in the title information to insert the suggested term. For some example embodiments, modification of the title information may cause the flow of FIG. 6 to automatically suggest additional terms. There may be an option to allow the user to decline receiving additional suggestions. The flow of FIG. 6 may end at block 685.

Figure 7:
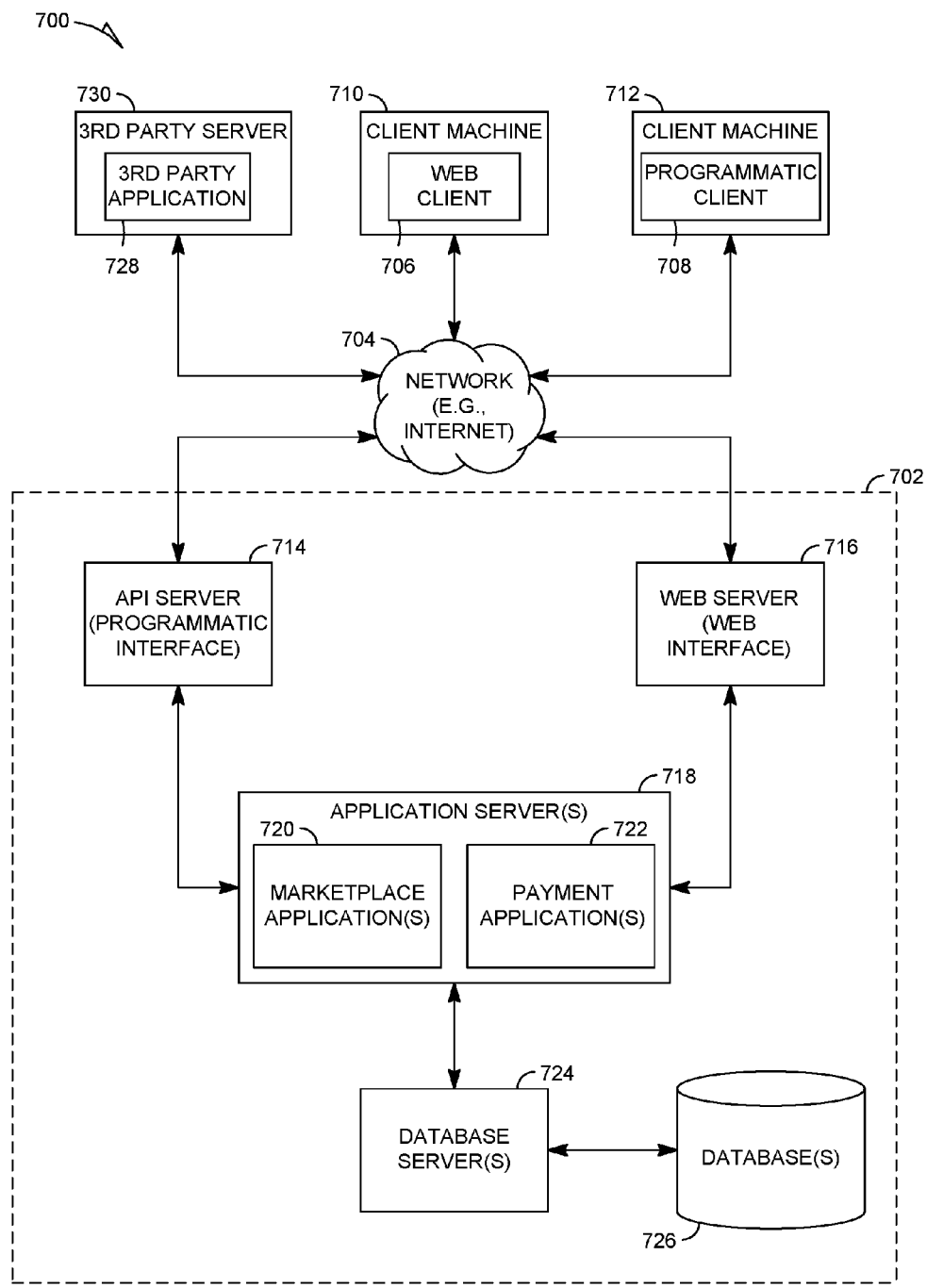
FIG. 7 is an example system diagram that may be used, in accordance with some example embodiments.

FIG. 7 is an example system diagram that may be used, in accordance with some example embodiments. System 700 may include a network and may be implemented using client-server architecture. A commerce platform, in the example form of a network-based system 702, may provide server-side functionality, via network 704 (e.g., the Internet) to one or more clients. FIG. 7 illustrates, for example, a web client 706 (e.g., a browser, such as the Internet Explorer® browser developed by Microsoft® Corporation of Redmond, Wash.), and a programmatic client 708 executing on respective client machines 710 and 712.

The network-based system 702 may include an application program interface (API) server 714 and a web server 716. The API server 714 and the web server 716 may be coupled to one or more application servers 718. The API server 714 and the web server 716 may provide programmatic and web interfaces to the one or more application servers 718. The application servers 718 may host one or more marketplace applications 720 and one or more payment applications 722. The application servers 718 may be coupled to one or more database servers 724 that facilitate access to information stored in one or more databases 726.

For some example embodiments, the marketplace applications 720 may provide a number of marketplace functions and services to users that access the network-based system 702. The payment applications 722 may provide a number of payment services and functions to the users. The payment applications 722 may allow the users to quantify and accumulate value (e.g., in a commercial currency, such as the U.S. dollar, or a proprietary currency, such as "points") in accounts, and then later to redeem the accumulated value for products (e.g., goods or services) that are made available via the marketplace applications 720.

In the current example, the marketplace applications 720 and the payment applications 722 are shown in FIG. 1 to both form part of the network-based system 702. It will be appreciated that, in alternative example embodiments, the payment applications 722 may form part of a payment service that is separate and distinct from the network-based system 702.

In the current example, the system 700 shown in FIG. 7 employs client-server architecture. It will be appreciated that the example embodiments are of course not limited to such architecture and could equally well find applications in a distributed or peer-to-peer architecture. The marketplace applications 720 and payment applications 722 may also be implemented as standalone software programs, which do not necessarily have networking capabilities.

The web client 706 may access services and functions provided by the marketplace applications 720 and the payment applications 722 via the web interface supported by the web server 716. Similarly, the programmatic client 708 may access services and functions provided by the marketplace applications 720 and the payment applications 722 via the programmatic interface provided by the API server 714. The programmatic client 708 may, for example, be a seller application (e.g., the TurboLister application developed by eBay Inc., of San Jose, Calif.) to enable sellers to author and manage listings on the network-based system 702 in an off-line manner and to perform batch-mode communications between the programmatic client 708 and the network-based system 702.

FIG. 7 also includes a third party application 728, executing on a third party server machine 730, as having programmatic access to the network-based system 702 via the programmatic interface provided by the API server 714. For example, the third party application 728 may, utilizing information retrieved from the network-based system 702, support one or more features or functions on a website hosted by a third party, referred to as a third party website. The third party website may, for example, provide one or more promotional, marketplace or payment functions that are supported by the relevant applications of the network-based system 702.

Figure 8:
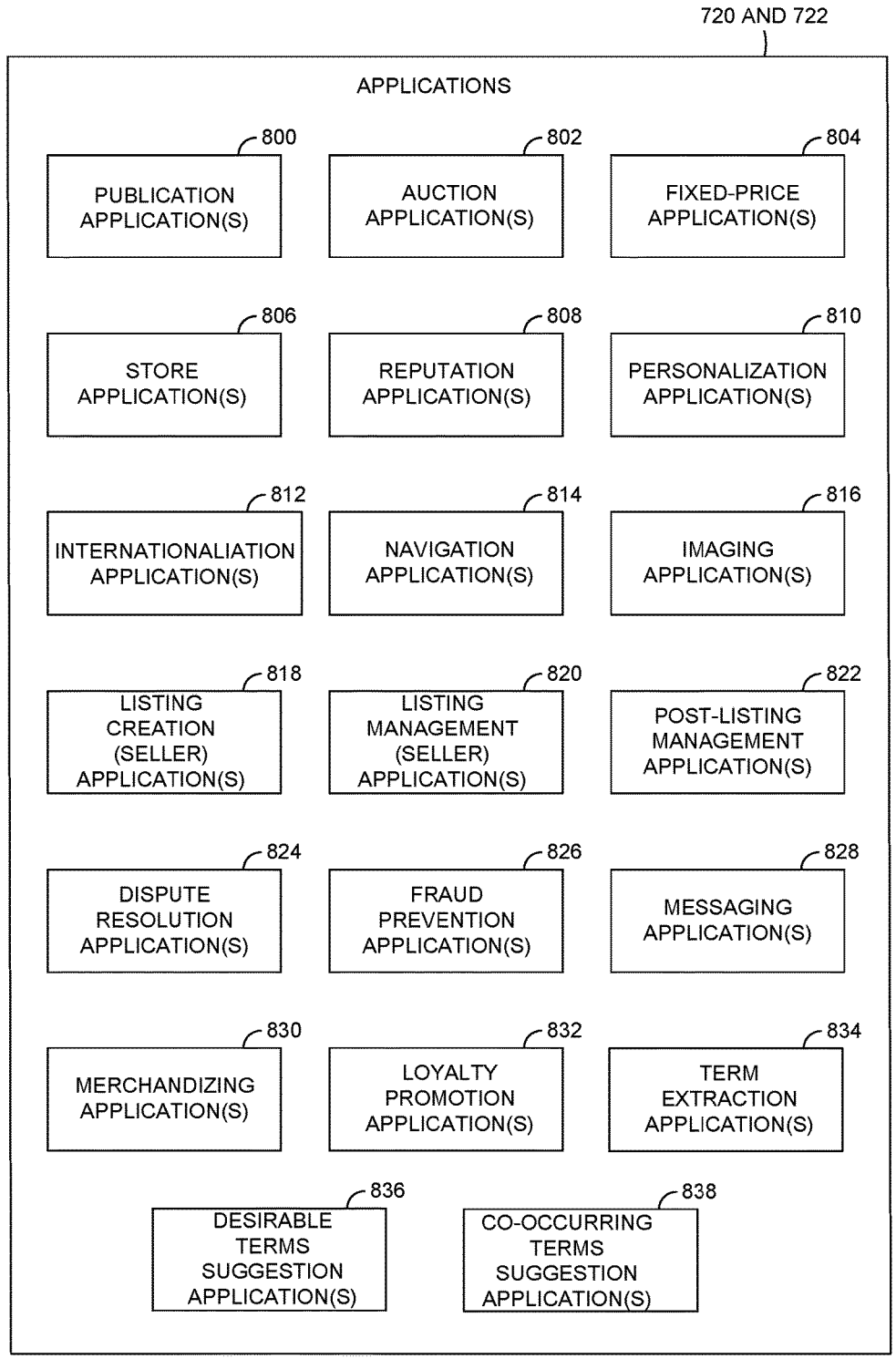
FIG. 8 is an example block diagram showing multiple marketplace applications that may be provided as part of a network-based marketplace, in accordance with some example embodiments.

FIG. 8 is an example block diagram showing multiple marketplace applications that may be provided as part of a network-based marketplace, in accordance with some example embodiments. The network-based system 702 (shown in FIG. 7) may include various market place applications 720 and payment applications 722.

The marketplace applications 720 may include one or more publication applications 800 which may provide a number of listing and price-setting mechanisms whereby a seller may list goods or services for sale, a buyer can express interest in or indicate a desire to purchase such goods or services, and a price can be set for a transaction pertaining to the goods or services.

The marketplace applications 720 may include one or more auction applications 802 which support auction-format listing and price setting mechanisms (e.g., English, Dutch, Vickrey, Chinese, Double, Reverse auctions, etc.). The various auction applications 802 may also provide a number of features in support of such auction-format listings, such as a reserve price feature whereby a seller may specify a reserve price in connection with a listing and a proxy-bidding feature whereby a bidder may invoke automated proxy bidding.

The marketplace applications 720 may include one or more fixed-price applications 804. The fixed-price applications 804 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that may be higher than the starting price of the auction.

The marketplace applications 720 may include one or more store applications 806. The store applications 806 may allow sellers to group their listings within a "virtual" store, which may be branded and otherwise personalized by and for the sellers. Such a virtual store may also offer promotions, incentives and features that are specific and personalized to a relevant seller.

The marketplace applications 720 may include one or more reputation applications 808. The reputation applications 808 may allow parties that transact utilizing the network-based system 702 to establish, build, and maintain reputations, which may be made available and published to potential trading partners. Consider that where, for example, the network-based system 702 supports person-to-person trading, users may have no history or other reference information whereby the trustworthiness and credibility of potential trading partners may be assessed. The reputation applications 808 may allow a user, for example through feedback provided by other transaction partners, to establish a reputation within the network-based system 702 over time. Other potential trading partners may then reference such a reputation for the purposes of assessing credibility and trustworthiness.

The marketplace applications 720 may include one or more personalization applications 810. The personalization applications 810 may allow users of the network-based system 702 to personalize various aspects of their interactions with the network-based system 702. For example a user may, utilizing an appropriate personalization application(s) 810, create a personalized reference page at which information regarding transactions to which the user is (or has been) a party may be viewed. Further, a personalization application(s) 810 may enable a user to personalize listings and other aspects of their interactions with the network-based system 702 and other parties.

For some example embodiments, the marketplace applications 720 may include international application(s) 812.

The international application(s) 812 may be used by the network-based system 702 to support a number of marketplaces that are customized for specific geographic regions. For example, there may be a version of the network-based system 702 customized for the United Kingdom, and there may be another version of the network-based system 702 customized for the United States. Each of these versions may operate as an independent marketplace, or they may be customized (or internationalized) presentations of a common underlying marketplace.

For some example embodiments, the marketplace application(s) 720 may include navigation applications 814 to facilitate navigating of the network-based system 702. For example, the navigation applications 814 may include a search module and a browse module. The search module may enable keyword searches of listings published via the network-based system 702. The browse module may allow users to browse various category, catalogue, or inventory data structures according to which listings may be classified within the network-based system 702. Various other navigation applications modules may be provided to supplement the search and browse modules.

In order to make listings, available via the network-based system 702, as visually informing and attractive as possible, the marketplace applications 720 may include one or more imaging application(s) 816. Users may upload images for inclusion within listings. The one or more imaging application(s) 816 may also operate to incorporate images within viewed listings. The imaging application(s) 816 may also support one or more promotional features, such as image galleries that are presented to potential buyers. For example, sellers may pay an additional fee to have an image included within a gallery of images for promoted items.

For some example embodiments, the marketplace applications 720 may include one or more listing creation applications 818. The listing creation applications 818 may allow sellers conveniently to author listings pertaining to goods or services that they wish to transact via the network-based system 702. The listing creation applications 818 may include modules that enable suggestions of item descriptions, in some example embodiments.

For some example embodiments, the marketplace applications 720 may include listing management applications 820 to allow sellers to manage such goods or services listings. Specifically, where a particular seller has authored and/or published a large number of listings, the management of such listings may present a challenge. The listing management applications 820 may provide a number of features (e.g., auto-relisting, inventory level monitors, etc.) to assist the seller in managing such listings.

One or more post-listing management application(s) 822 also assist sellers with a number of activities that typically occurs post-listing. For example, upon completion of an auction facilitated by one or more auction applications 802, a seller may wish to leave feedback regarding a particular buyer. To this end, a post-listing management application(s) 822 may provide an interface to one or more reputation applications 808, so as to allow the seller conveniently to provide feedback regarding multiple buyers to the reputation applications 808. As another example, upon completion of an auction where the goods or services has not sold, the item may automatically be relisted in the auction application(s) 802 and/or the fixed-price application(s) 804.

The marketplace applications 720 may include dispute resolution applications 824. The dispute resolution applications 824 provide mechanisms whereby disputes arising between transacting parties may be resolved. For example, the dispute resolution applications 824 may provide guided procedures whereby the parties are guided through a number of steps in an attempt to settle a dispute. In the event that the dispute cannot be settled via the guided procedures, the dispute may be escalated to a third party mediator or arbitrator.

The marketplace applications 720 may include fraud prevention applications 826. A number of fraud prevention applications 826 implement various fraud detection and prevention mechanisms to reduce the occurrence of fraud within the network-based system 702.

The marketplace applications 720 may include messaging applications 828. The messaging applications 828 are responsible for the generation and delivery of messages to users of the network-based system 702. Such messages, for example, advise users regarding the status of listings at the network-based system 702 (e.g., providing "outbid" notices to bidders during an auction process or to provide promotional and merchandising information to users).

The marketplace applications 720 may include merchandising applications 830. The merchandising applications 830 may support various merchandising functions that are made available to sellers to enable sellers to increase sales via the network-based system 702. The merchandising applications 830 also operate the various merchandising features that may be invoked by sellers, and may monitor and track the success of merchandising strategies employed by sellers.

The network-based system 702 itself, or one or more parties that transact via the network-based system 702, may operate loyalty programs that are supported by one or more loyalty/promotions applications 832. For example, a buyer may earn loyalty or promotions points for each transaction established and/or concluded with a particular seller, and may be offered a reward for which accumulated loyalty points can be redeemed.

The marketplace applications 720 may include terms extraction applications 834. The terms extraction applications 834 may retrieve terms from the title information (or from other information associated with an item being listed) for the purpose of determining terms to be suggested. The desirable terms suggestion applications 836 may analyze the stored search queries and suggest terms based on their desirability scores. The co-occurring terms suggestion applications 838 may analyze the stored search queries and the stored item information to find co-occurring terms and may suggest the co-occurring terms based on the terms included in the title information of the item being listed. The terms extraction applications 834, the desirable terms suggestion applications 836 and the co-occurring terms suggestion applications 838 may operate with and/or use data associated with one or more applications included in the marketplace applications 720.

Even though the context of this description is with regard to marketplace applications, it is to be understood by those of skill in the art that the described subject matter may also be applicable to other types of applications for various types of transactions. The transactions may include those between a single seller and a single buyer or may include those between a single seller and multiple buyers, and may include selling a catalog-type product, or even a more unique product. It may also be noted that although the description may refer to a seller or a buyer in commerce or marketplace environments, certain aspects of the description may also be applicable to non-commerce environments.

Figures 9A, 9B, 9C:
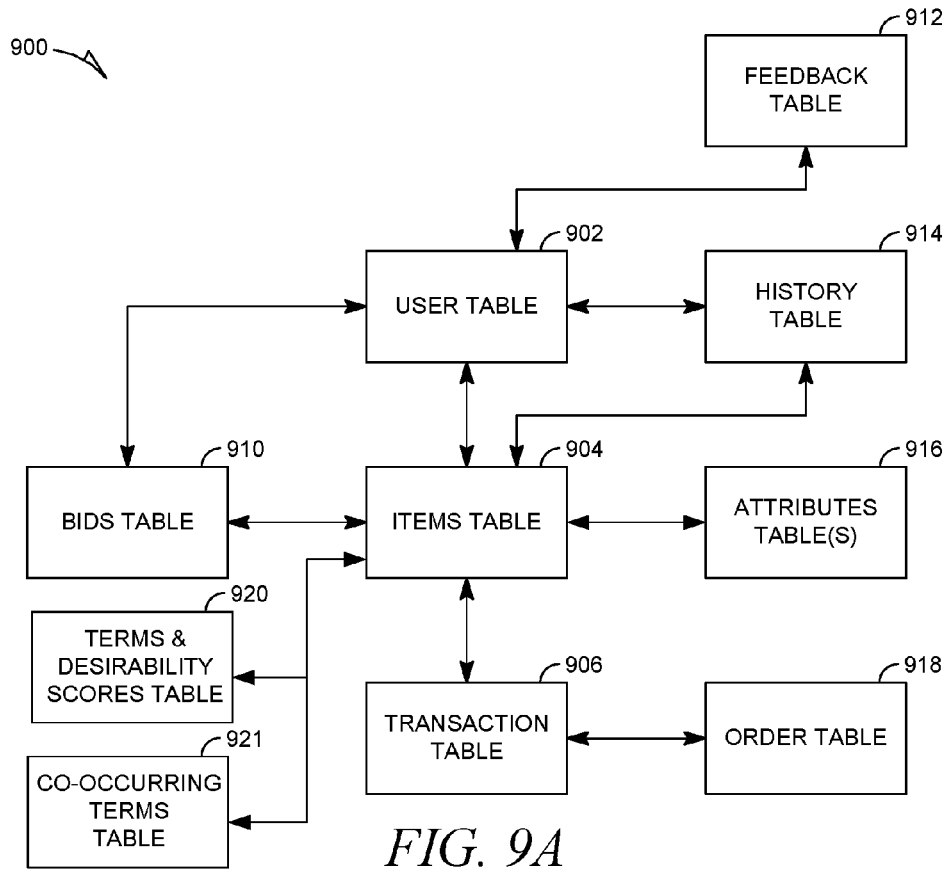
FIG. 9A is a high-level entity-relationship diagram, illustrating various example tables, in accordance with some example embodiments.
FIG. 9B is an example diagram of a terms and desirability score table, in accordance with some example embodiments.
FIG. 9C is an example diagram of a co-occurring terms table, in accordance with some example embodiments.

FIG. 9A is a high-level entity-relationship diagram, illustrating various tables 900 that may be maintained within the databases 726 (shown in FIG. 7), and that are utilized by and support the applications 720 and 722 (shown in FIGS. 7-8). A user table 902 contains a record for each registered user of the network-based system 702, and may include identifier, address and financial instrument information pertaining to each such registered user. A user may operate as a seller, a buyer, or both, within the network-based system 702. In one example embodiment, a buyer may be a user that has accumulated value (e.g., commercial or proprietary currency), and is accordingly able to exchange the accumulated value for items that are offered for sale by the network-based system 702.

The tables 900 also include an items table 904 in which are maintained item records for goods and services that are available to be, or have been, transacted via the network-based system 702. Each item record within the items table 904 may furthermore be linked to one or more user records within the user table 902, so as to associate a seller and one or more actual or potential buyers with each item record.

A transaction table 906 contains a record for each transaction (e.g., a purchase or sale transaction) pertaining to items for which records exist within the items table 904.

An order table 918 is populated with order records, each order record being associated with an order. Each order, in turn, may be with respect to one or more transactions for which records exist within the transaction table 906.

Bid records within a bids table 910 each relate to a bid received at the network-based system 702 in connection with an auction-format listing supported by an auction application(s) 802 (shown in FIG. 8). A feedback table 912 is utilized by one or more reputation applications 808 (shown in FIG. 8), in one example embodiment, to construct and maintain reputation information concerning users. A history table 914 maintains a history of transactions to which a user has been a party. One or more attributes tables 916 record attribute information pertaining to items for which records exist within the items table 904. Considering only a single example of such an attribute, the attributes tables 916 may indicate a currency attribute associated with a particular item, the currency attribute identifying the currency of a price for the relevant item as specified in by a seller. The terms and desirability scores table 920 may include information that may be used to suggest terms based on desirability scores. The co-occurring terms table 921 may include information that may be used to suggest terms based on the co-occurring terms that may be used, for example, in the title information of an item being listed.

FIG. 9B provides further example details regarding the terms and desirability scores table, in accordance with some example embodiments. As illustrated, the terms and desirability scores table 920 may include multiple records. Each of the records 952, 954, 956 may be associated with a term and its corresponding desirability score. FIG. 9C provides further example details regarding the co-occurring terms table, in accordance with some example embodiments. The co-occurring terms table 921 may also include multiple records. Each of the records 962, 964, 966 may be associated with a term and its corresponding co-occurring term.

Figure 10:
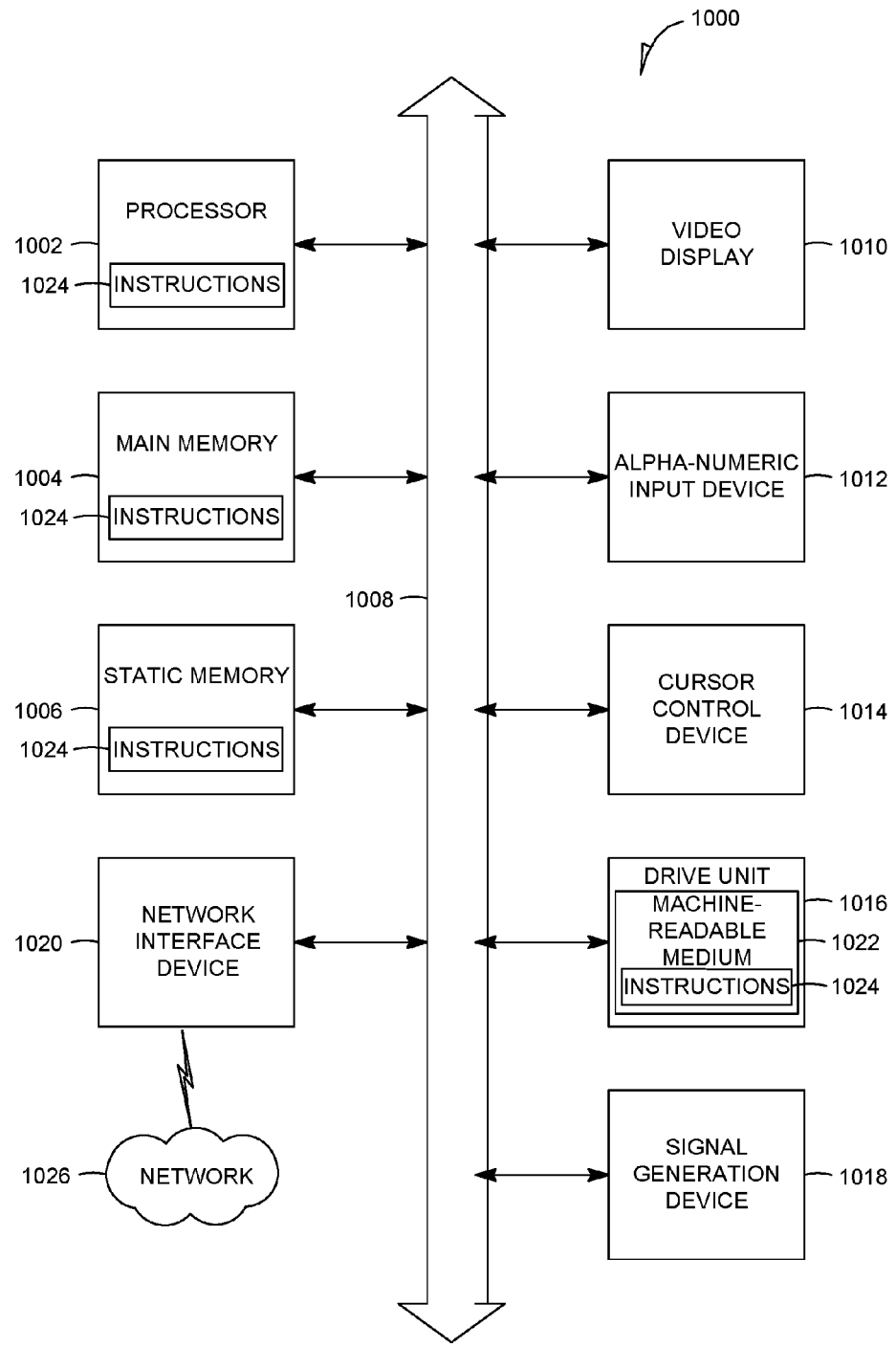
FIG. 10 is an example diagram of a representation of a machine in the example form of a computer system that may be used, in accordance with some example embodiments.

FIG. 10 illustrates an example diagram of a representation of a machine in the example form of a computer system that may be used, in accordance with some example embodiments. Set of instructions for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the current example, computer system 1000 may include a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., liquid crystals display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., or software) 1024 embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

The instructions 1024 may further be transmitted or received over a network 1026 via the network interface device 1020. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers)

that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure.

It may be appreciated that FIGS. 1-10 are merely representational and may not be drawn to scale. Certain proportions thereof may be exaggerated, while others may be minimized. Accordingly, the specification and drawings are to be regarded in an illustrative rather than a restrictive sense.

In the foregoing description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the description, with each claim standing on its own as a separate embodiment.

Thus, a method and system to push information related to items offered for sale to potential buyers or viewers have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A computer-implemented method, comprising:
receiving a title of an item being listed;
identifying stored search queries that would cause the item being listed to be included in a search result;
determining relevance of the title as related to each of the identified search queries;
sorting the identified search queries based on the determined relevance of the title;
determining a desirability score, the determining comprising:
extracting terms from each of the search queries;
adding the extracted terms to a set of stored terms to generate updated stored terms; and
for each extracted term, calculating a demand percentage based on the updated stored terms;
based on the sorted identified search queries, retrieving, by a hardware processor, a desirability score for a term included in the identified search queries, the desirability score being based on the demand percentage;
generating a suggestion of a modification to the title, the suggestion of the modification including the term and the corresponding retrieved desirability score; and
transmitting instructions to a client machine that causes the client machine to display the suggestion of the modification including the term, the corresponding retrieved desirability score, and an option to add or remove the suggested term.

2. The method of claim 1, further comprising:
identifying co-occurring terms in the stored search queries; and
matching a term found in the title with the identified co-occurring terms,
wherein the generating the suggestion of the modification comprises including at least a subset of the matching identified co-occurring terms that match the terms found in the title.

3. The method of claim 1, wherein the determining the desirability score further comprises:
determining a total occurrence of unique terms in titles of stored items; and
determining a supply percentage of each unique term based on the total occurrence.

4. The method of claim 3, wherein the desirability score is further based on the supply percentage.

5. The method of claim 1, further comprising:
retrieving pairs of the suggested term and the corresponding desirability score from a terms and desirability scores table in a database.

6. A system, comprising:
one or more processors; and
a memory storing instructions that, when executed by the one or more processors, cause the one or more processors to perform operations comprising:
receiving a title of an item being listed;
identifying stored search queries that would cause the item being listed to be included in a search result;
determining relevance of the title as related to each of the identified search queries;
sorting the identified search queries based on the determined relevance of the title;
determining a desirability score, the determining comprising:
extracting terms from each of the search queries;
adding the extracted terms to a set of stored terms to generate updated stored terms; and
for each extracted term, calculating a demand percentage based on the updated stored terms;
based on the sorted identified search queries, retrieving a desirability score for a term included in the identified search queries, the desirability score being based on the demand percentage;
generating a suggestion of a modification to the title, the suggestion of the modification including the term and the corresponding retrieved desirability score; and
transmitting instructions to a client machine that causes the client machine to display the suggestion of the modification including the term, the corresponding retrieved desirability score, and an option to add or remove the suggested term.

7. The system of claim 6, wherein the operations further comprise:

identifying co-occurring terms in the stored search queries; and matching a term found in the title with the identified co-occurring terms, wherein the generating the suggestion of the modification comprises including at least a subset of the matching identified co-occurring terms that match the terms found in the title.

8. The system of claim 6, wherein the determining the desirability score further comprises:

determining a total occurrence of unique terms in titles of stored items; and determining a supply percentage of each unique term based on the total occurrence.

9. The system of claim 8, wherein the desirability score is further based on the supply percentage.

10. The system of claim 6, wherein the operations further comprise:

retrieving pairs of the suggested term and the corresponding desirability score from a terms and desirability scores table in a database.

11. A computer-readable hardware storage device having stored therein a set of program instructions which, when executed by the computer causes the computer to perform operations comprising:

receiving a title of an item being listed;

identifying stored search queries that would cause the item being listed to be included in a search result;

determining relevance of the title as related to each of the identified search queries;

sorting the identified search queries based on the determined relevance of the title;

determining a desirability score, the determining comprising:

extracting terms from each of the search queries;

adding the extracted terms to a set of stored terms to generate updated stored terms; and for each extracted term, calculating a demand percentage based on the updated stored terms;

based on the sorted identified search queries, retrieving a desirability score for a term included in the identified search queries, the desirability score being based on the demand percentage;

generating a suggestion of a modification to the title, the suggestion of the modification including the term and the corresponding retrieved desirability score; and transmitting instructions to a client machine that causes the client machine to display the suggestion of the modification including the term, the corresponding retrieved desirability score, and an option to add or remove the suggested term.

12. The storage medium of claim 11, wherein the operations further comprise:

identifying co-occurring terms in the stored search queries; and matching a term found in the title with the identified co-occurring terms, wherein the generating the suggestion of the modification comprises including at least a subset of the matching identified co-occurring terms that match the terms found in the title.

13. The storage medium of claim 11, wherein the determining the desirability score further comprises:

determining a total occurrence of unique terms in titles of stored items; and determining a supply percentage of each unique term based on the total occurrence.

14. The storage medium of claim 13, wherein the desirability score is further based on the supply percentage.

15. The storage medium of claim 11, wherein the operations further comprise:

retrieving pairs of the suggested term and the corresponding desirability score from a terms and desirability scores table in a database.

* * * * *